(12) United States Patent
Abdo

(10) Patent No.: US 8,443,309 B2
(45) Date of Patent: May 14, 2013

(54) MULTIFEATURE TEST PATTERN FOR OPTICAL PROXIMITY CORRECTION MODEL VERIFICATION

(75) Inventor: Amr Y. Abdo, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 13/040,580

(22) Filed: Mar. 4, 2011

(65) Prior Publication Data

US 2012/0227017 A1    Sep. 6, 2012

(51) Int. Cl.
G06F 17/50    (2006.01)
(52) U.S. Cl.
USPC .............................. 716/53; 716/54
(58) Field of Classification Search ............... 716/53, 716/54
See application file for complete search history.

(56) References Cited

U.S. PATENT DOCUMENTS

| | | | |
|---|---|---|---|
| 4,144,493 A | 3/1979 | Lee et al. | |
| 4,801,869 A | 1/1989 | Sprogis | |
| 5,902,703 A | 5/1999 | Leroux et al. | |
| 5,962,173 A | 10/1999 | Leroux et al. | |
| 6,528,818 B1 | 3/2003 | Satya et al. | |
| 6,602,642 B2 | 8/2003 | Liu et al. | |
| 6,989,896 B2 | 1/2006 | Wen et al. | |
| 7,049,157 B2 | 5/2006 | Lu et al. | |
| 7,176,675 B1 | 2/2007 | Liegl | |
| 7,335,881 B2 | 2/2008 | Tanaka et al. | |
| 7,444,615 B2 | 10/2008 | Percin et al. | |
| 7,449,689 B2 | 11/2008 | Nagatomo et al. | |
| 7,474,001 B2 | 1/2009 | Zhao et al. | |
| 7,736,916 B2 | 6/2010 | Aghababazadeh et al. | |
| 7,827,520 B2 | 11/2010 | Choi | |
| 2006/0236297 A1* | 10/2006 | Melvin et al. | 716/21 |
| 2006/0282814 A1* | 12/2006 | Percin et al. | 716/21 |
| 2007/0031745 A1* | 2/2007 | Ye et al. | 430/30 |
| 2009/0240362 A1* | 9/2009 | Mimotogi et al. | 700/97 |
| 2009/0249261 A1* | 10/2009 | Kim et al. | 716/2 |
| 2010/0229147 A1* | 9/2010 | Ye et al. | 716/19 |
| 2011/0283244 A1* | 11/2011 | Abdo et al. | 716/55 |

* cited by examiner

Primary Examiner — Thuan Do
Assistant Examiner — Magid Dimyan
(74) Attorney, Agent, or Firm — Cantor Colburn LLP; Ian MacKinnon

(57) ABSTRACT

A method for optical proximity correction (OPC) model accuracy verification for a semiconductor product includes generating a multifeature test pattern, the multifeature test pattern comprising a plurality of features selected from the semiconductor product; exposing and printing the multifeature test pattern on a test wafer under a process condition; generating an OPC model of the semiconductor product for the process condition; and comparing the test wafer to the OPC model to verify the accuracy of the OPC model.

20 Claims, 9 Drawing Sheets

900

GENERATE MULTIFEATURE TEST PATTERN BASED ON REPRESENTATIVE FEATURES FROM SEMICONDUCTOR PRODUCT
901

↓

EXPOSE AND PRINT MULTIFEATURE TEST PATTERN ON TEST WAFER UNDER A PROCESS CONDITION
902

↓

GENERATE OPC MODEL OF SEMICONDUCTOR PRODUCT UNDER PROCESS CONDITION OF BLOCK 902
903

↓

COMPARE OPC MODEL TO TEST WAFER TO VERIFY ACCURACY OF OPC MODEL; MAKE CHANGES TO OPC MODEL AS NEEDED BASED ON COMPARISON
904

↓

REPEAT BLOCKS 902-905 FOR ANY APPROPRIATE NUMBER OF DIFFERENT PROCESS CONDITIONS
905

MULTIFEATURE TEST PATTERN FOR OPTICAL PROXIMITY CORRECTION MODEL VERIFICATION

BACKGROUND

This disclosure relates generally to the field of integrated circuit manufacturing, and more particularly to verification patterns for optical proximity correction (OPC) numerical models.

The formation of various integrated circuit (IC) structures on a wafer often relies on lithographic processes, sometimes referred to as photolithography or lithography. Lithographic processes can be used to transfer a pattern of a photomask (or mask) to a semiconductor wafer.

A pattern may be formed using a photoresist layer disposed on a wafer by passing light energy through a photomask (or mask) of the pattern to image the desired pattern onto the photoresist layer. The pattern is thereby transferred to the photoresist layer. In areas where the photoresist is sufficiently exposed to the light, and after a development process, the photoresist material becomes soluble such that it may be removed to selectively expose an underlying layer (e.g., a semiconductor layer, hard mask layer, etc.). Portions of the photoresist layer not exposed to a threshold amount of light energy will not be removed and serve to protect the underlying layer during further processing of the wafer (e.g., etching exposed portions of the underlying layer, implanting ions into the wafer, etc.). After processing is completed, the remaining portions of the photoresist layer may be removed.

There is a trend in IC fabrication to increase the density with which various structures are arranged on a wafer; feature size, line width, and the separation between features and lines are becoming increasingly smaller. For example, nodes with a critical dimension (CD) of about 65 nanometers (nm) to about 45 nm have been proposed. In these sub-micron processes, yield of the wafer manufacturing process is affected by factors such as mask pattern fidelity, optical proximity effects, and photoresist processing. Some of the more prevalent concerns include line end pullback or bridging, corner rounding, and line width variations. Contact holes may also have a tendency to bridge and/or shift from a desired location. These concerns are largely dependent on local pattern density and topology.

OPC modeling is a technique used to improve lithographic image fidelity in semiconductor fabrication. OPC involves executing an OPC software program on a computer. The OPC program carries out a computer simulation that takes an initial data set having information relating to a desired pattern on a semiconductor product, and manipulates the data set to arrive at a corrected data set in an attempt to compensate for the above-mentioned concerns. The photomask can then be made in accordance with the corrected data set. The OPC process can be governed by a set of optical rules, employing fixed rules for geometric manipulation of the data set, modeling principles, employing predetermined behavior data to drive geometric manipulation of the data set, or a hybrid set of optical and fixed rules.

Prior to correcting a data set using OPC, it may be desirable to verify the performance (or accuracy) of the OPC model upon which the OPC routine relies and to select one of a plurality of OPC models to be used during the OPC routine. Verifying an OPC model may involve hand checking layout corrections made to a test pattern that is exposed and printed on a test wafer to verify that the OPC model performs in an expected manner. Such techniques for validating OPC models involve intensively manual processes that are time consuming and prone to error.

BRIEF SUMMARY

In one aspect, a method for optical proximity correction (OPC) model accuracy verification for a semiconductor product includes generating a multifeature test pattern, the multifeature test pattern comprising a plurality of features selected from the semiconductor product; exposing and printing the multifeature test pattern on a test wafer under a process condition; generating an OPC model of the semiconductor product for the process condition; and comparing the test wafer to the OPC model to verify the accuracy of the OPC model.

In another aspect, a test mask comprises a multifeature test pattern for optical proximity correction (OPC) model accuracy verification for a semiconductor product, the multifeature test pattern comprising a plurality of features selected from the semiconductor product, wherein the test mask is configured to be exposed and printed under a process condition on a test wafer that is compared to an OPC model of the semiconductor product generated for the process condition to verify the accuracy of the OPC model.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
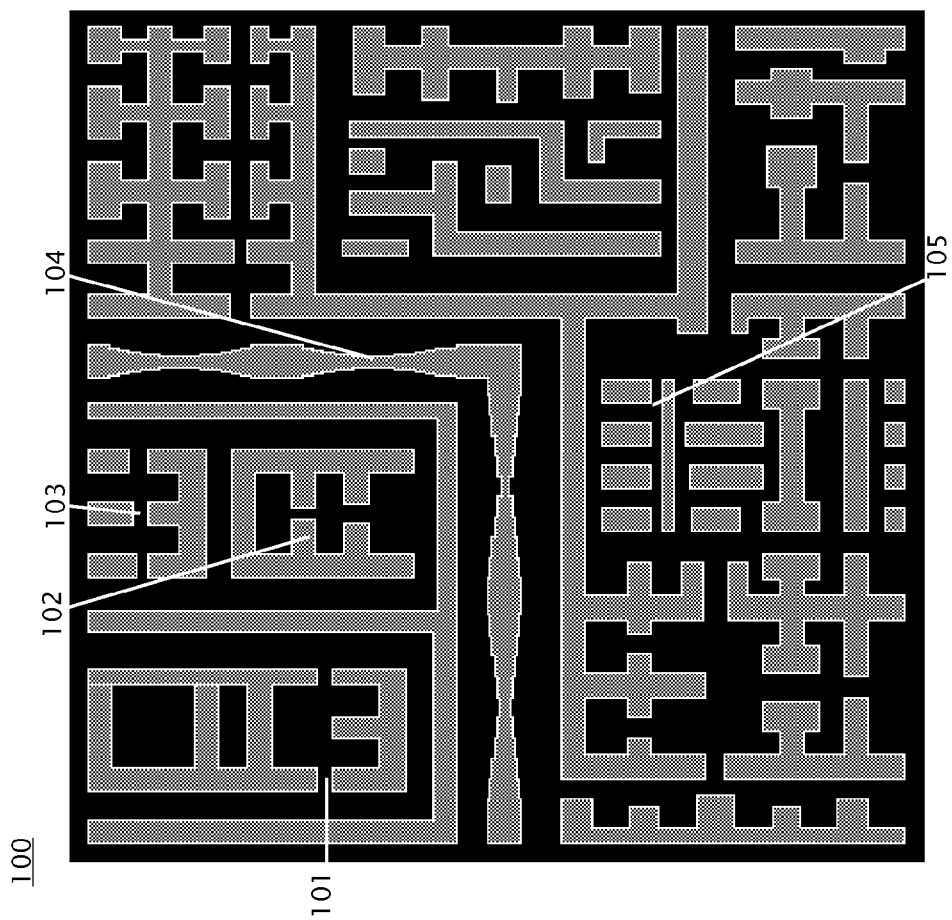
FIG. 1 is a top view of an embodiment of a multifeature test pattern for OPC model verification.

Embodiments of a multifeature test pattern for OPC are provided, with exemplary embodiments being discussed below in detail. A test pattern is designed to include a selection of multiple features that are present in a final semiconductor wafer product. By designing a single test pattern that combines a plurality of features that exist in the semiconductor product, and in the OPC model of the semiconductor product, to be measured as well as produce failure aspects, the OPC verification data collection process may be simplified, allowing collection of OPC verification data for a relatively large number of wafer features under a wide variety of process conditions. The features that may be included in the multifeature test pattern may include, but are not limited to: pitch, line-end, dense line-end, H bar, broken H bar, nested U, mirror U, landing-pad, two-T, snake, mushroom, rotated-L, and contacts. The time required to validate the OPC model may be reduced, and the amount of data available for different process conditions increased. Inclusion of multiple features in a single test pattern may also ensure that the modeler is able find data for all of the semiconductor product features that need to be validated. Failure modes, including pinching, bridging, necking, and ringing, may also be evaluated under a variety of process conditions.

The OPC model is a numerical tool that simulates aspects of the exposure process. OPC model verification to check the performance and accuracy of the OPC model is an essential step in the OPC process. The multifeature test pattern may be designed to contain features that are arranged so as to include some or all of the representative features in the semiconductor product being modeled. The multifeature test pattern is exposed and printed on a wafer to collect verification data, and compared to an OPC model representing the production process, or the mask exposure process, generated using OPC computer simulation. The OPC model is also constructed using test structures that are representative of the semiconductor product. Exposure, printing, and modeling may be repeated for a wide variety of process conditions. Data from a printed test wafer, including both CD measurements and printing contours of individual features on the test wafer and images of the test wafer, are then used to verify the accuracy of the prediction of the OPC model. The verification process may check aspects of the OPC model such as the ability of the OPC model to accurately predict the CDs of the printed features, and to predict failure aspects, such as bridging, pinching, necking, and ringing, under different process conditions.

The measurements and images of the printed test pattern on the test wafer may be taken by a scanning electron microscope (SEM). The multifeature test pattern may be designed such that the size of the printed multifeature test pattern is about the same as the maximum field of image of the SEM. The resolution of the multifeature test pattern may also be designed to be about the same as the maximum resolution of the SEM. Therefore, the size and resolution of a multifeature test pattern may depend on the particular SEM tool being used to take the validation measurements of the test wafer. In some embodiments of OPC verification, only images of the test wafer test structures are overlaid and compared to the OPC model prediction, without performing comparison of individual feature CD measurements. In such an embodiment, selection of the size and resolution of the multifeature test pattern based on the SEM requires only one image of the test wafer to be taken by the SEM per process condition, as the image may contain the entire test pattern at a relatively high resolution. This allows OPC verification to be performed over a wide variety of process conditions relatively quickly. In embodiments in which measurements of the individual features on the printed wafer are also performed, the metrology time as well as the time for the OPC verification process may also be significantly reduced by the presence of a relatively large number of features on the single multifeature test pattern, requiring only one test wafer to be exposed and printed per process condition.

FIG. 1 illustrates an embodiment of a multifeature test pattern 100. The multifeature test pattern includes a plurality of IC test features and possible failure modes, including but not limited to possible bridging at 101, broken H bar 102, pitch and line end 103, possible pinching at 104, and possible ringing at 105. Multifeature test pattern 100 is shown for illustrative purposes only; a multifeature test pattern may include any number and type of features, arranged in any appropriate way, based on the test pattern features representing the features present in the final semiconductor product being evaluated by the OPC model. The features on a multifeature test pattern, such as multifeature test pattern 100, may include, but are not limited to, any or all of pitch (also referred to as dense lines), line-end, dense line-end, H bar, broken H bar, nested U, mirror U, landing-pad, two-T, snake, mushroom, rotated-L, and contact (also referred to as pillar) features. Failure modes that may be evaluated include but are not limited to pinching, bridging, necking, and ringing. The multifeature test pattern may be designed such that only a single exposure and printing of the test pattern per process condition is necessary to collect data for each of the features in the final semiconductor wafer product. The size and resolution of a multifeature test pattern may be determined based on the field of image of an SEM used to take the images and/or measurements of the printed test wafer that are used to validate the OPC model.

Figure 2:
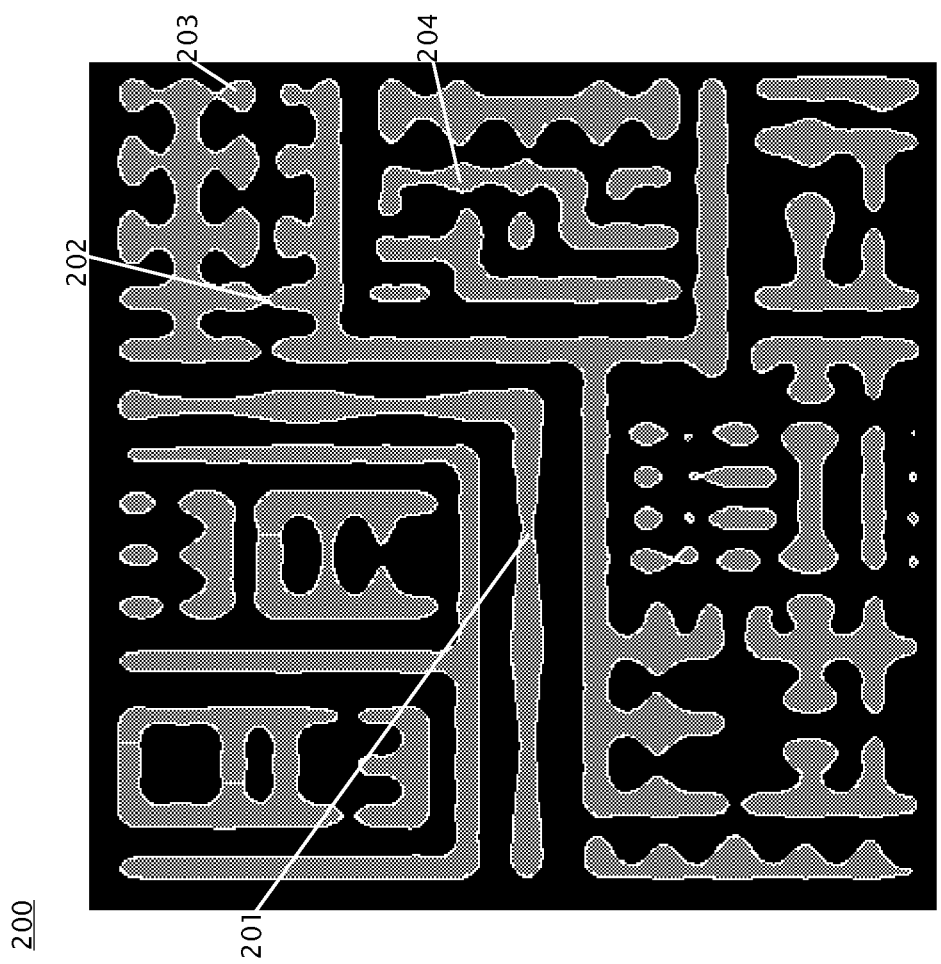
FIG. 2 is a top view of the printed multifeature test pattern for OPC model verification of FIG. 1 at a focus of negative 80 nanometers (nm).
Figure 3:
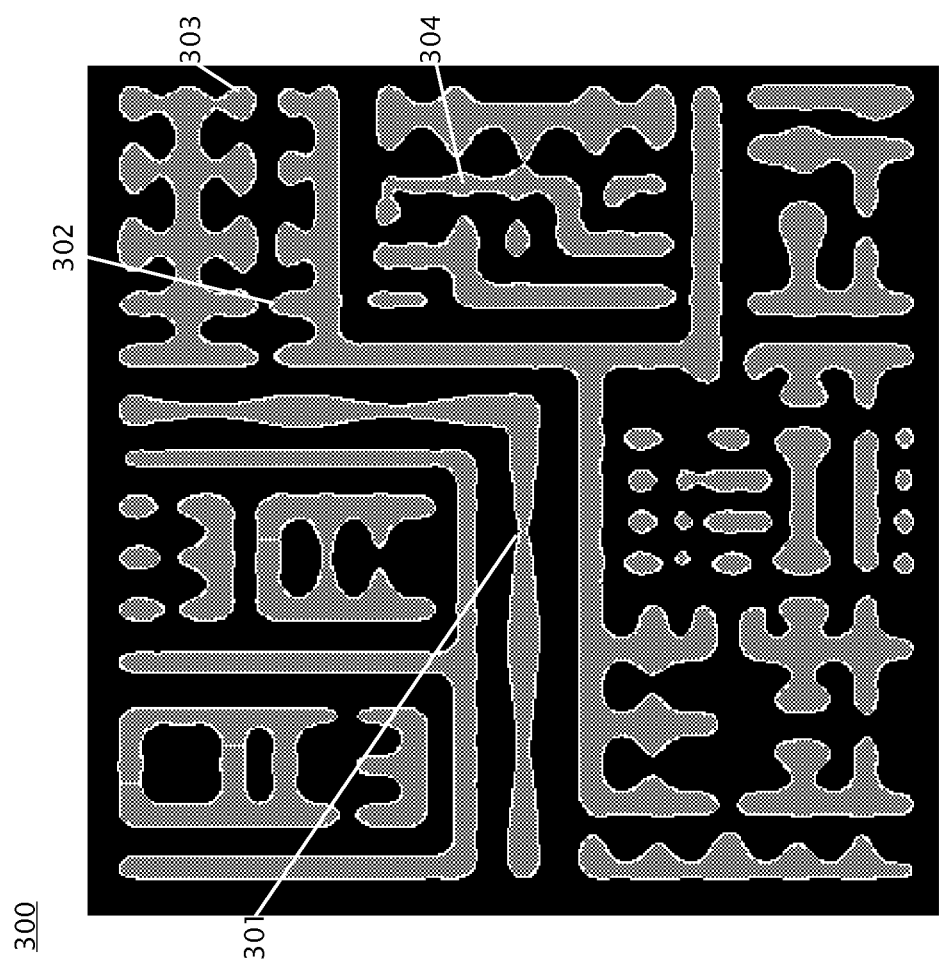
FIG. 3 is a top view of the printed multifeature test pattern for OPC model verification of FIG. 1 at a focus of negative 40 nm.
Figure 4:
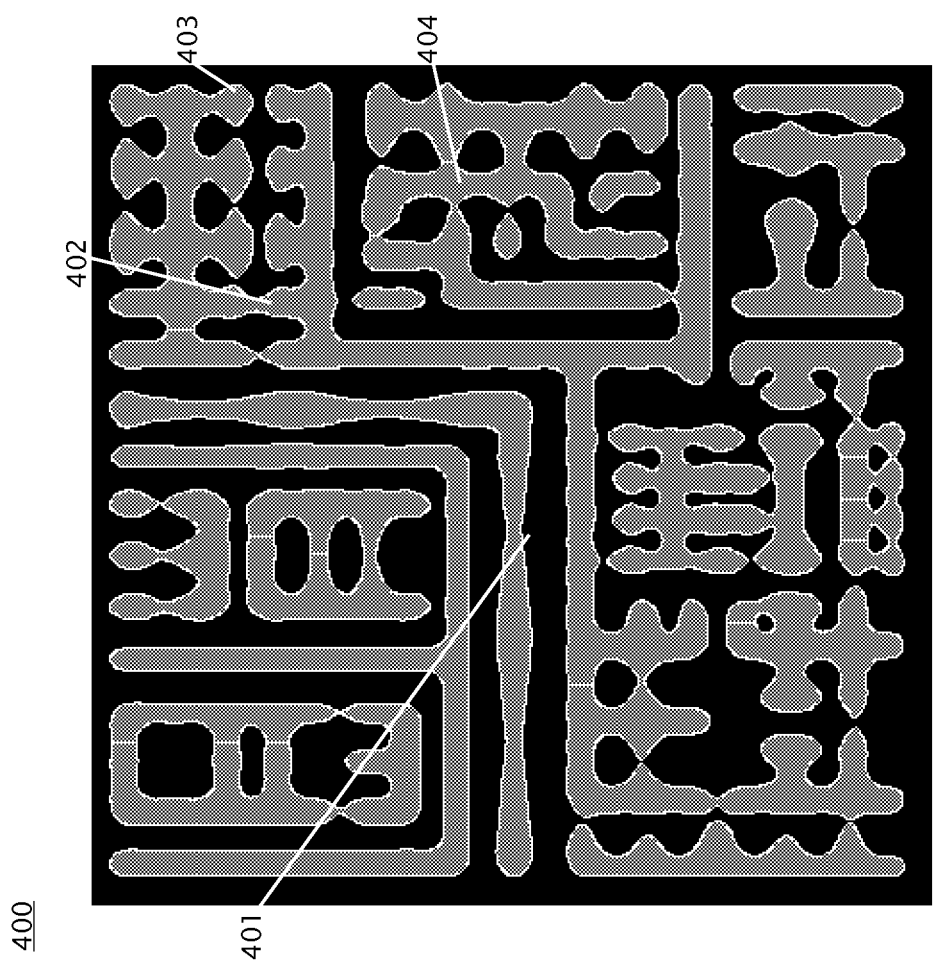
FIG. 4 is a top view of the printed multifeature test pattern for OPC model verification of FIG. 1 at a negative 10% dose.
Figure 5:
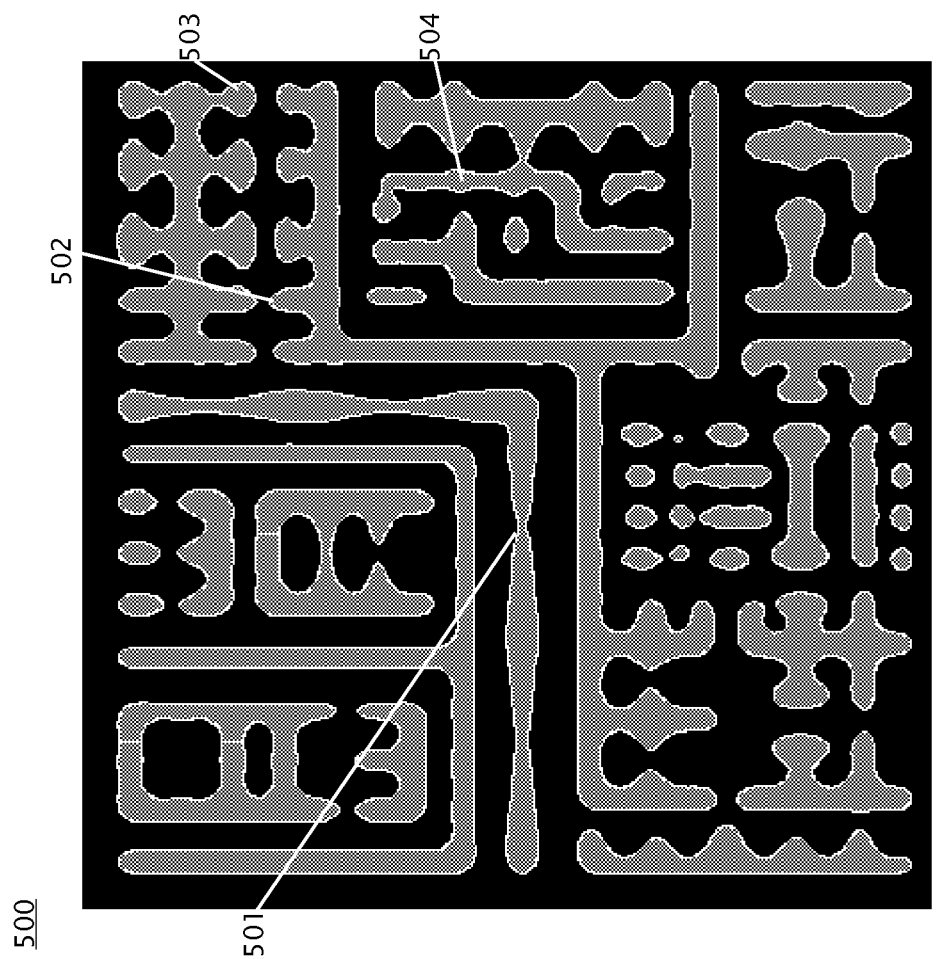
FIG. 5 is a top view of the printed multifeature test pattern for OPC model verification of FIG. 1 at a best focus.
Figure 6:
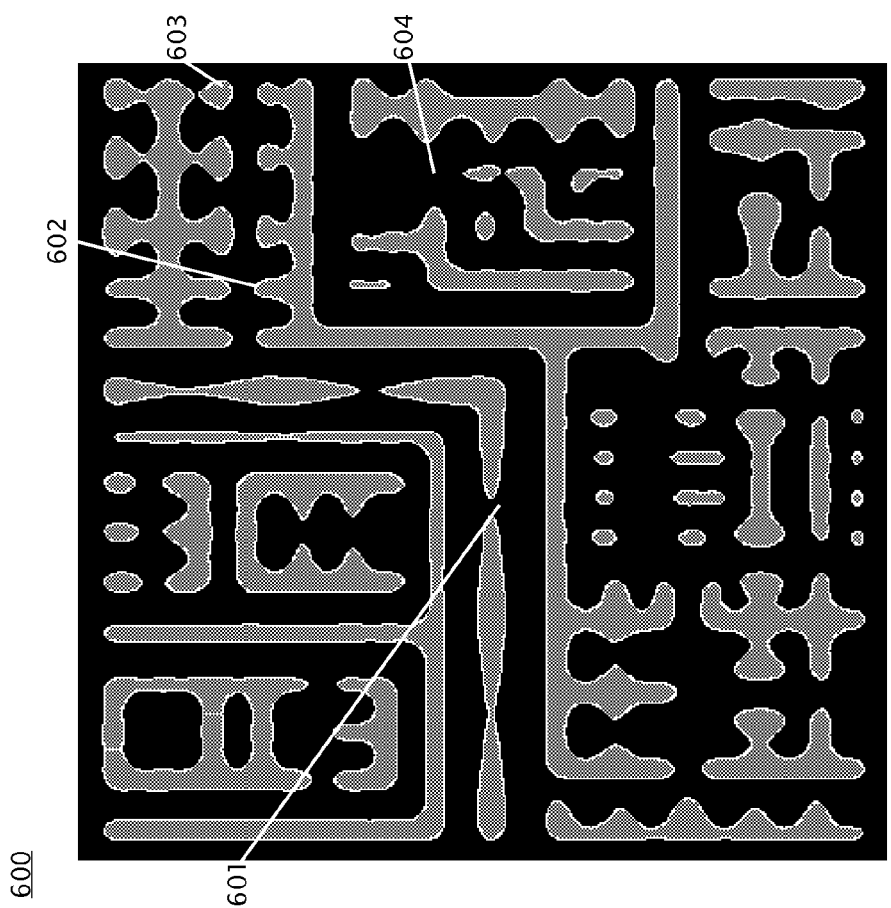
FIG. 6 is a top view of the printed multifeature test pattern for OPC model verification of FIG. 1 at a positive 10% dose.
Figure 7:
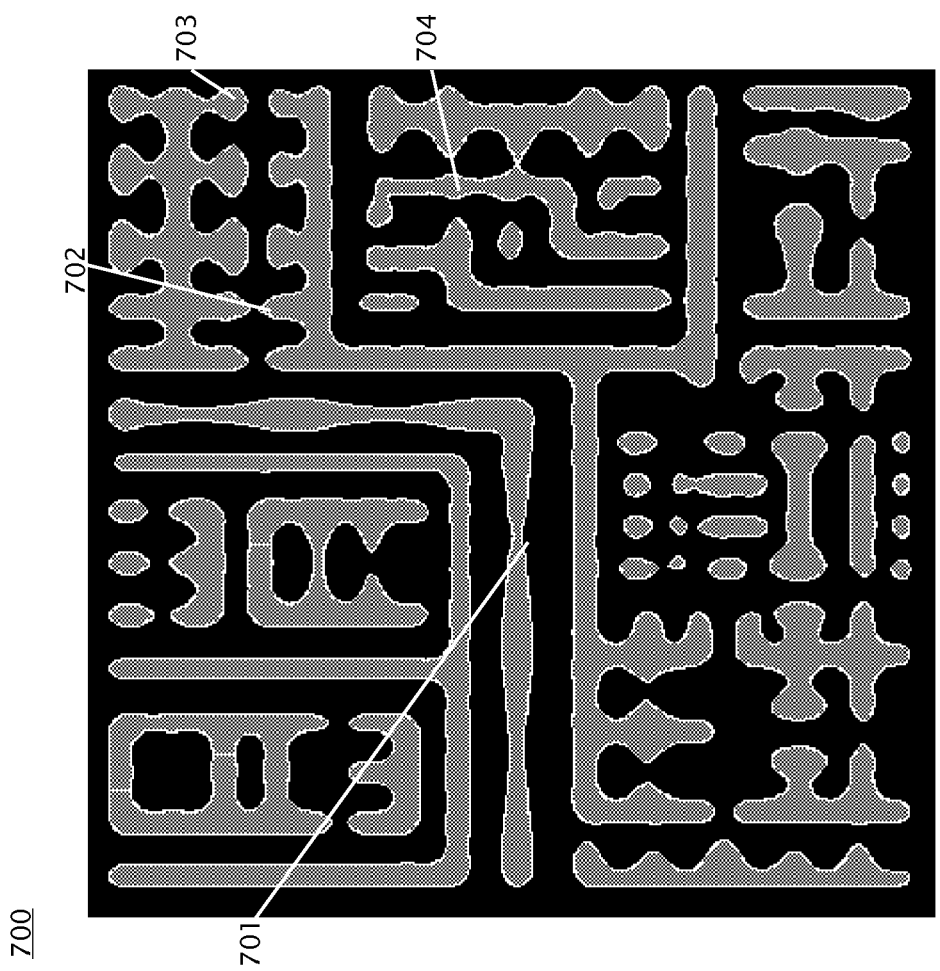
FIG. 7 is a top view of the printed multifeature test pattern for OPC model verification of FIG. 1 at a focus of positive 40 nm.
Figure 8:
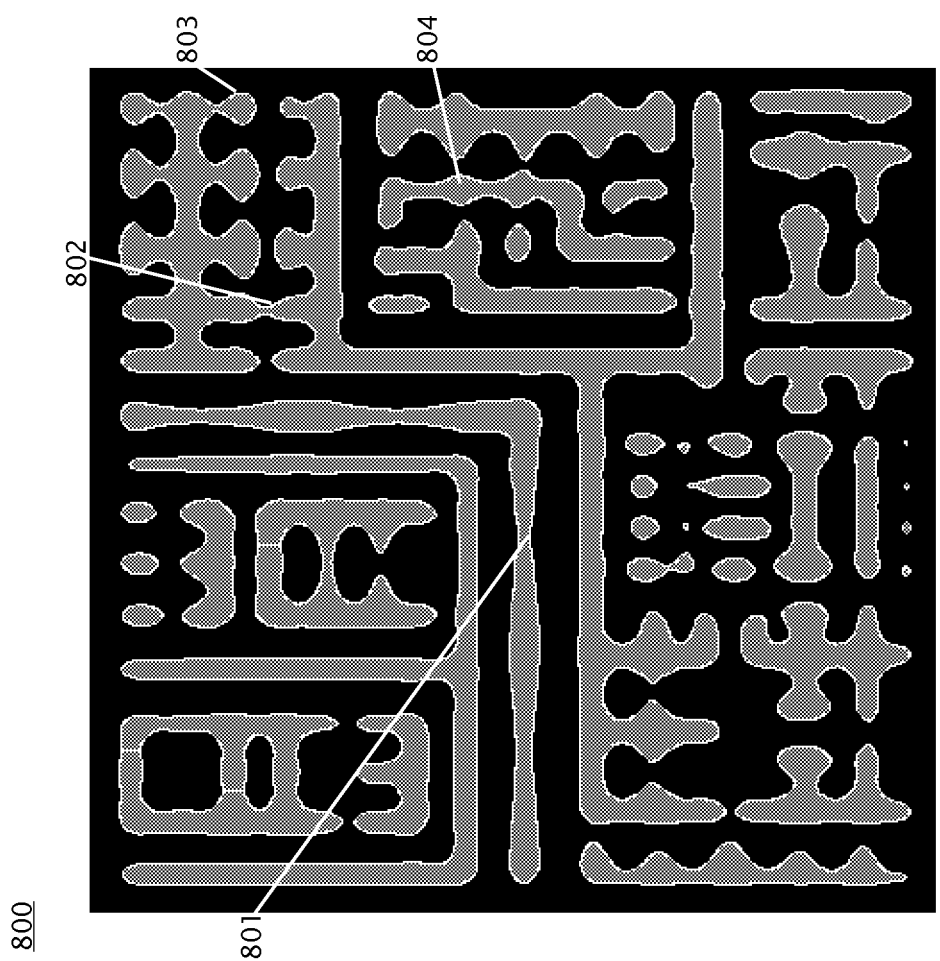
FIG. 8 is a top view of the printed multifeature test pattern for OPC model verification of FIG. 1 at a focus of positive 80 nm.

FIGS. 2-8 illustrate embodiments of the multifeature test pattern 100 of FIG. 1 as exposed and printed under various different process conditions. The semiconductor product may be processed under various different dose and focus conditions during production; printed test patterns under such varied conditions, such as FIGS. 2-8, may be used to verify that the OPC model is valid within a band of accepted process conditions. Printed multifeature test patterns 200-800 are shown for illustrative purposes only; a multifeature test pattern may be exposed and printed under any number of different process conditions. FIG. 2 shows a printed multifeature test pattern 200 at a focus of negative 80 nm. Various failure modes are illustrated in multifeature test pattern 200, including pinching at 201, bridging at 202, necking at 203, and ringing at 204. FIG. 3 shows a printed multifeature test pattern 300 at a focus of negative 40 nm, and shows how the pinching at 301, bridging at 302, necking at 303, and ringing at 304 vary under the changed focus. FIG. 4 shows a printed multifeature test pattern 400 for OPC at a negative 10% dose, and shows how the pinching at 401, bridging at 402, necking at 403, and ringing at 404 vary under the changed focus. FIG. 5 shows a printed multifeature test pattern 500 at a best focus, and shows how the pinching at 501, bridging at 502, necking at 503, and ringing at 504 vary under the changed focus. FIG. 6 shows a printed multifeature test pattern 600 at a positive 10% dose, and shows how the pinching at 601, bridging at 602, necking at 603, and ringing at 604 vary under the changed focus. FIG. 7 shows a printed multifeature test pattern 700 at a focus of positive 40 nm, and shows how the pinching at 701, bridging at 702, necking at 703, and ringing at 704 vary under the changed focus. FIG. 8 shows a printed multifeature test pattern 800 at a focus of positive 80 nm, and shows how the pinching at 801, bridging at 802, necking at 803, and ringing at 804 vary under the changed focus. Data may be collected from each of printed multifeature test patterns 200-800 using, for example, an SEM to take images or perform individual CD measurements.

Figure 9:
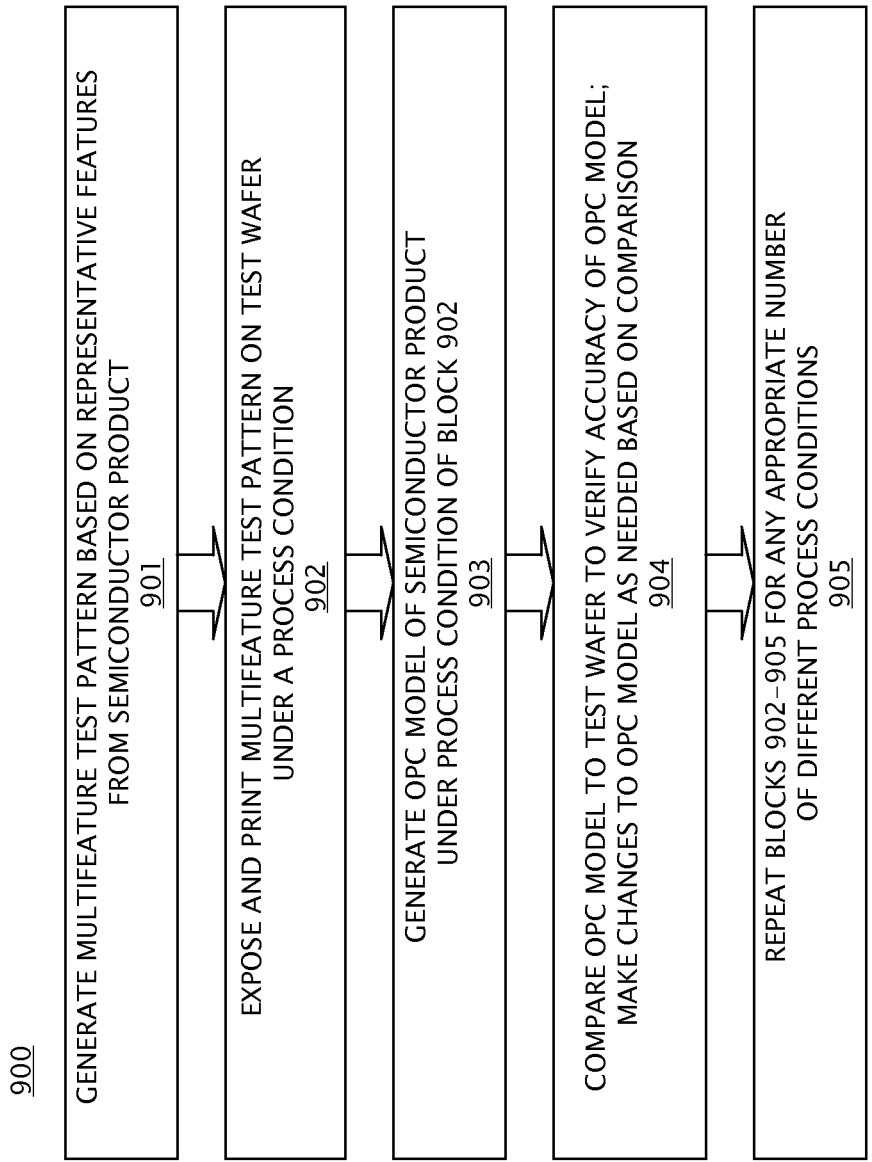
FIG. 9 illustrates a flowchart of an embodiment of a method for OPC verification using a multifeature test pattern.

FIG. 9 illustrates an embodiment of a method 900 of performing OPC verification using a multifeature test pattern. In block 901, a multifeature test pattern is generated based on the semiconductor product being modeled using OPC. The multifeature test pattern may include a plurality of features of any appropriate number and type, in any appropriate arrangement. The features on a multifeature test pattern may include, but are not limited to, any or all of pitch, line-end, dense line-end, H bar, broken H bar, nested U, mirror U, landing-pad, two-T, snake, mushroom, rotated-L, and contact features. Failure modes that may be evaluated include but are not limited to pinching, bridging, necking, and ringing. The multifeature test pattern may have a size and resolution determined based on a field of image and resolution of an SEM being used to take images of the printed and exposed test wafers to collect data for the OPC verification process. In block 902, the multifeature test pattern is put on a test mask that is exposed and printed on a test wafer under a specific process condition. For example, the multifeature test pattern may be exposed and printed under any of the process conditions shown with respect to FIGS. 2-8, or under any other appropriate process condition. In block 903, an OPC model of the semiconductor product under the process condition used in block 902 is generated using a computer. In block 904, the OPC model is compared to the test wafer. The comparison may be performed using image(s) of the test wafer, or measurements of individual CDs of features on the test wafer, taken by an SEM. In some embodiments, only a single image of the test wafer may be required. Modifications to the OPC model may then be determined based on the comparison. In block 905, blocks 902-904 may be repeated for any number of additional different process conditions. This allows determination of whether the OPC model will predict failures if the process conditions are changed.

The technical effects and benefits of exemplary embodiments include simplification of an OPC verification process by reducing necessary metrology requests and increasing available verification data.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for optical proximity correction (OPC) model accuracy verification for a semiconductor product, the method comprising:
   generating a multifeature test pattern, the multifeature test pattern comprising a plurality of features selected from the semiconductor product, wherein the plurality of features of the multifeature test pattern comprises at least two of: pitch, line-end, dense line-end, H bar, broken H bar, nested U, mirror U, landing-pad, two-T, snake, mushroom, rotated-L, and contact, and wherein the multifeature test pattern further includes one or more failure modes, the one or more failure modes comprising at least one of bridging, necking, and ringing;
   exposing and printing the multifeature test pattern on a test wafer under a process condition;
   generating an OPC model of the semiconductor product for the process condition; and
   comparing the test wafer to the OPC model to verify the accuracy of the OPC model.

2. The method of claim 1, wherein the plurality of features comprises each of: pitch, line-end, dense line-end, H bar, broken H bar, nested U, mirror U, landing-pad, two-T, snake, mushroom, rotated-L, and contact.

3. The method of claim 1, further comprising repeating exposing and printing the multifeature test pattern on a test wafer, generating an OPC model, and comparing the test wafer to the OPC model to verify the accuracy of the OPC model for a plurality of process conditions.

4. The method of claim 3, wherein the one or more failure modes are evaluated across the plurality of process conditions.

5. The method of claim 4, wherein the one or more failure modes includes each of: bridging, necking, and ringing.

6. The method of claim 1, wherein comparing the test wafer to the OPC model to verify the OPC model comprises taking an image of the test wafer using a scanning electron microscope (SEM), and comparing the image to the OPC model.

7. The method of claim 6, wherein a size of the multifeature test pattern is determined based on a size of a field of image of the SEM.

8. The method of claim 6, wherein a resolution of the multifeature test pattern is determined based on a resolution of the SEM.

9. The method of claim 6, wherein a single image of the test wafer is taken by the SEM per process condition for the purpose of OPC model verification.

10. The method of claim 1, wherein comparing the test wafer to the OPC model to verify the OPC model comprises taking a measurement of a critical dimension (CD) of a feature on the test wafer using the SEM, and comparing the measurement to the feature in the OPC model.

11. A test mask comprising a multifeature test pattern for optical proximity correction (OPC) model accuracy verification for a semiconductor product, the multifeature test pattern comprising a plurality of features selected from the semiconductor product, wherein the test mask is configured to be exposed and printed under a process condition on a test wafer that is compared to an OPC model of the semiconductor product generated for the process condition to verify the accuracy of the OPC model, wherein the plurality of features of the multifeature test pattern comprises at least two of: pitch, line-end dense line-end, H bar, broken H bar, nested U, mirror U, landing-pad, two-T, snake, mushroom, rotated-L, and contact, and wherein the multifeature test pattern further includes one or more failure modes, the one or more failure modes comprising at least one of bridging, necking, and ringing.

12. The multifeature test pattern of claim 11, wherein the plurality of features comprises each of: pitch, line-end, dense line-end, H bar, broken H bar, nested U, mirror U, landing-pad, two-T, snake, mushroom, rotated-L, and contact.

13. The multifeature test pattern of claim 11, wherein the test mask is further configured to be exposed and printed on a plurality of test wafers under a plurality of process conditions, and wherein the plurality of test wafers are compared to the OPC model to verify the accuracy of the OPC model for the plurality of process conditions.

14. The multifeature test pattern of claim 13, wherein the one or more failure modes are evaluated across the plurality of process conditions.

15. The multifeature test pattern of claim 14, wherein the one or more failure modes includes each of: bridging, necking, and ringing.

16. The multifeature test pattern of claim 11, wherein comparing the test wafer to the OPC model to verify the OPC model comprises taking an image of the test wafer using a scanning electron microscope (SEM), and comparing the image to the OPC model.

17. The multifeature test pattern of claim 16, wherein a size of the multifeature test pattern is determined based on a size of a field of image of the SEM.

18. The multifeature test pattern of claim 16, wherein a resolution of the multifeature test pattern is determined based on a resolution of the SEM.

19. The multifeature test pattern of claim 16, wherein a single image of the test wafer is taken by the SEM per process condition for the purpose of OPC model verification.

20. The multifeature test pattern of claim 11, wherein comparing the test wafer to the OPC model to verify the OPC model comprises taking a measurement of a critical dimension (CD) of a feature on the test wafer using the SEM, and comparing the measurement to the feature in the OPC model.

* * * * *